(12) United States Patent
Parrenin

(10) Patent No.: US 10,814,504 B2
(45) Date of Patent: Oct. 27, 2020

(54) SYSTEM FOR CONTROLLING THE PRESSURE OF A SEALED ENCLOSURE

(71) Applicant: COMMISSARIAT A L'ENERGIE ATOMIQUE ET AUX ENERGIES ALTERNATIVES, Paris (FR)

(72) Inventor: Cedric Parrenin, Til-Chatel (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 253 days.

(21) Appl. No.: 15/779,574

(22) PCT Filed: Nov. 30, 2016

(86) PCT No.: PCT/EP2016/079322
§ 371 (c)(1),
(2) Date: May 29, 2018

(87) PCT Pub. No.: WO2017/093344
PCT Pub. Date: Jun. 8, 2017

(65) Prior Publication Data
US 2019/0275686 A1 Sep. 12, 2019

(30) Foreign Application Priority Data
Dec. 2, 2015 (FR) ...................................... 15 61725

(51) Int. Cl.
*B25J 21/02* (2006.01)
*G05D 16/20* (2006.01)

(52) U.S. Cl.
CPC .......... *B25J 21/02* (2013.01); *G05D 16/2053* (2013.01)

(58) Field of Classification Search
CPC ............................ B25J 21/02; G05D 16/2053
(Continued)

(56) References Cited

U.S. PATENT DOCUMENTS

| 4,584,930 A | 4/1986 | Connolly |
| 5,385,505 A * | 1/1995 | Sharp ................... B08B 15/023 454/238 |

(Continued)

FOREIGN PATENT DOCUMENTS

| CN | 204557172 U | 8/2015 |
| EP | 0 091 759 A1 | 10/1983 |
| WO | WO 01/17855 A1 | 3/2001 |

OTHER PUBLICATIONS

International Search Report dated Feb. 8, 2017 in PCT/EP2016/079322 filed Nov. 30. 2016.
(Continued)

*Primary Examiner* — Minh Chau T Pham
(74) *Attorney, Agent, or Firm* — Oblon, McClelland, Maier & Neustadt, L.L.P.

(57) ABSTRACT

A system for controlling pressure of a sealed enclosure such as a glove box or containment vessel, including: a first control circuit configured to keep a current pressure value of the sealed enclosure within an operational pressure range, and configured to isolate the sealed enclosure and to transmit a primary alarm signal in event of current pressure value reaching one or other of primary limits of a degradation range; an independent secondary safety circuit separate from the primary circuit, the secondary safety circuit configured to isolate the sealed enclosure and to transmit a secondary alarm signal when the pressure of the sealed enclosure reaches one or other of secondary limits of an alarm range.

16 Claims, 5 Drawing Sheets

(58) Field of Classification Search
USPC .................. 55/385.2, DIG. 34; 96/296, 397; 310/104; 423/210; 454/187, 251, 253
See application file for complete search history.

(56) References Cited

U.S. PATENT DOCUMENTS

| | | | |
|---|---|---|---|
| 6,305,148 B1 | 10/2001 | Bowden et al. | |
| 8,034,141 B2* | 10/2011 | Polsky | A61L 2/04 312/1 |
| 10,029,258 B2* | 7/2018 | Lang | B08B 15/026 |
| 10,302,318 B1* | 5/2019 | Chambers | A61G 10/005 |
| 2002/0078661 A1 | 6/2002 | Bowden et al. | |
| 2002/0124537 A1* | 9/2002 | Manna | A61B 5/1172 55/385.2 |
| 2010/0314960 A1* | 12/2010 | Polsky | A61G 10/02 310/104 |
| 2011/0126498 A1* | 6/2011 | Polsky | G01R 33/0047 55/385.2 |

OTHER PUBLICATIONS

Preliminary French Search Report dated Sep. 9, 2016 in French Application 1561725 filed Dec. 2, 2015.
Grinnell; J. J. et al., "Tritium Glovebox Stripper System Seismic Design Evaluation", Savannah River National Laboratory, Sep. 2015, SRNL-STI-2015-00453, Revision 0, 51 total pages, XP055301144.

* cited by examiner

SYSTEM FOR CONTROLLING THE PRESSURE OF A SEALED ENCLOSURE

TECHNICAL FIELD

The present invention relates to the field of glove box or containment enclosure type tight enclosures and more particularly, relates to monitoring the pressure of tight enclosures and their safety.

STATE OF PRIOR ART

In many industrial fields, tight enclosures (i.e., glove boxes or containment enclosures) are used to confine or handle hazardous materials.

More particularly, the tight enclosure ensures static containment of the hazardous material in a fully closed and tight perimeter. Further, a pressure regulation system coupled with the tight enclosure ensures dynamic containment by creating a pressure gradient between the hazardous material contained in the enclosure and the local surroundings.

FIG. 5 schematically illustrates a system 301 for regulating a tight enclosure 307, according to prior art.

The regulating system 301 is for keeping the tight enclosure 307 to a vacuum level belonging to an operational interval between about −50 daPa and −30 daPa while sweeping it by a neutral gas or air.

More particularly, the regulating system includes a drive circuit 303 comprising a pressure sensor 311, a solenoid blowing valve 321, a solenoid extracting valve 323, and an automatic drive 315.

The pressure sensor is for measuring the pressure of the tight enclosure.

The solenoid blowing 321 and extracting 323 valves are respectively connected to fluid lines for blowing 317 and extracting 319 a neutral gas or air. The solenoid blowing valve 321 is for regulating neutral gas or air blowing at a light pressure (about 400 millibar) in the tight enclosure 307. The solenoid extracting valve 323 is for regulating gas or air extraction from the tight enclosure 307.

Besides, the automatic drive 315 is for driving the solenoid blowing 321 and extracting 323 valves as a function of the pressure value measured such that this pressure value remains within the operational interval. Indeed, when the vacuum threshold of the lower bound (i.e. −50 daPa) of the operational interval is reached, the solenoid extracting valve 323 closes and the solenoid blowing valve 321 opens by order of the automatic drive 315. When the vacuum threshold of the upper bound (i.e. −30 daPa) of the operational interval is reached, the solenoid extracting valve 323 opens and the solenoid blowing valve 321 closes by order of the automatic drive.

Further, in case where the pressure value of the enclosure 307 reaches either of the primary bounds of a degradation interval between about −70 daPa and −20 daPa, the solenoid blowing 321 and extracting 323 valves close by order of the automatic drive 315 and an alert signal 325 is reported to a surveillance or remote surveillance centre 309.

However, in case of a single or combined failure of some critical elements among for example the pressure sensor and the solenoid blowing and extracting valves, the tight enclosure can fall outside a permissible vacuum range for a longer or shorter time slot. Indeed, some time is necessary between receiving the alert signal and maintenance operator intervening. In particular, if the pressure sensor is failing, it can transmit erroneous values to the automatic drive which in turn, generates erroneous sequences of driving the solenoid valves that can put the tight enclosure in overpressure or over-vacuum. If the solenoid extracting valve remains open, the vacuum can uncontrollably increase and if the solenoid blowing valve remains blocked, the pressure can uncontrollably increase.

Further, in case where the automatic drive itself is failing during a degraded mode, the report of the alert signal will not be made and in this case, the tight enclosure can remain outside the permissible vacuum range over a long period of time without the surveillance centre being informed.

Thus, the object of the present invention is to overcome the aforementioned drawbacks by providing a system for monitoring the pressure of a tight enclosure capable of automatically securing the tight enclosure while making the transmission of the alert signal reliable.

DISCLOSURE OF THE INVENTION

One object of the invention is a system for monitoring the pressure of a glove box or containment enclosure type tight enclosure, comprising a primary drive circuit configured to keep a current pressure value of the tight enclosure in an operational pressure interval, said primary drive circuit being further configured to insulate the tight enclosure and to transmit a primary alert signal in case where the current pressure value reaches either of the primary bounds of a degradation interval, said system further including a secondary safety circuit independent of and dissimilar to said primary circuit, said secondary safety circuit being configured to insulate the tight enclosure and to transmit a secondary alert signal when the pressure of the tight enclosure reaches either of the secondary bounds of an alarm interval.

This enables both the automatic safety of the tight enclosure and the real time transmission of an alert to a surveillance centre to be made reliable.

Advantageously, the primary drive circuit is a programmed logic circuit and the secondary safety circuit is a wired logic circuit. Both these circuits thus correspond to two parallel and independent paths and in particular, the wired logic circuit is simple, very robust and very reliable.

According to one embodiment of the present invention, said primary drive circuit includes:
- a primary measuring module configured to measure a first current pressure value of the tight enclosure,
- a primary module of adjustment valves, and
- an automatic drive configured to drive the primary adjustment module such that said first current pressure value remains within the operational interval, said automatic drive being further configured to control insulation of the tight enclosure and to transmit said primary alert signal in case where said first current pressure value reaches either of the primary bounds of the degradation interval, and said secondary safety circuit includes:
- a secondary measuring module configured to measure a second current pressure value of the tight enclosure and to trigger a safety signal when said second pressure value reaches either of the secondary bounds of the alarm interval,
- a secondary module of safety valves, and
- a safety module configured to transmit said safety signal to the secondary module of valves on the one hand in order to insulate the tight enclosure and to a surveillance centre on the other hand, said safety signal corresponding to said secondary alert signal.

Thus, both circuits include simple, independent elements made according to different technologies.

Advantageously, the secondary measuring module includes:
- a first pressure switch configured to trigger the safety signal when said second current pressure value reaches a first secondary bound of the alarm interval, and
- a second pressure switch configured to trigger the safety signal when said second current pressure value reaches a second secondary bound of the alarm interval.

Thus, by allocating a distinct pressure switch for each alarm threshold, the reliability of the monitoring system is still further increased.

Advantageously, the safety module is a safety relay configured to relay the safety signal triggered by either of the first and second pressure switches to the secondary module of safety valves on the one hand in order to insulate the tight enclosure and to the surveillance centre on the other hand.

The safety relay is a very simple, very reliable and very robust component.

Advantageously, the primary module of regulation valves includes a primary extracting valve for being connected to an extracting fluid line and a primary blowing valve for being connected to a blowing fluid line, and the secondary module of safety valves includes a secondary extracting valve for being connected in series with the primary extracting valve, and a secondary blowing valve for being connected in series with the primary blowing valve.

Advantageously, the secondary module of safety valves further includes a gas inlet or vacuum specific valve for being connected to a gas inlet or vacuum ancillary fluid line.

Thus, a gas or vacuum inlet can be monitored, relative to a specific method for being implemented in the tight enclosure.

Advantageously, each of the primary extracting and blowing valves includes a by-pass fluid line enabling in case of failure, either of said primary valves to be short-circuited.

This enables the tight enclosure to be more easily put again under vacuum in case of failure of one element of the primary module of adjustment valves.

Advantageously, the system includes manual valves upstream and downstream of each of the primary and secondary extracting and blowing valves.

The upstream and downstream manual valves enable the replacement of failing elements to be facilitated by keeping the pressure gradient in the tight enclosure.

Advantageously, the system includes a measuring manifold comprising the primary and secondary measuring modules as well as a tightness test pressure intake and a double shutoff connector.

The test pressure intake enables a tightness measuring apparatus to be directly connected. The double shutoff connector enables the measuring modules to be uncoupled for maintenance actions.

Advantageously, the primary bounds of the degradation interval are contained in the alarm interval.

This enables interference problems between both primary and secondary circuits to be avoided. Moreover, within the context of periodic tests, elements from both circuits can be easily discriminated for detecting failing elements.

Advantageously, the primary bounds are about −20 daPa and −70 daPa, and the secondary bounds are about −10 daPa and −80 daPa.

Advantageously, the system includes an ultimate safety hydraulic valve.

The invention also aims at a tight enclosure comprising the monitoring system according to any of the preceding characteristics. The tight enclosure can be a glove box or a containment enclosure.

Further advantages and characteristics of the invention will appear in the detailed non-limiting description below.

BRIEF DESCRIPTION OF THE DRAWINGS

Embodiments of the invention will now be described by way of non-limiting examples, in reference to the appended drawings, in which.

DETAILED DISCLOSURE OF A PREFERRED EMBODIMENT

The principle of the invention consists in using two parallel, independent and dissimilar circuits for making automatic safety of a tight enclosure reliable when the pressure of the same is outside a permissible vacuum range. It will be noted that the tight enclosure can be a glove box or a containment enclosure.

Figure 1:
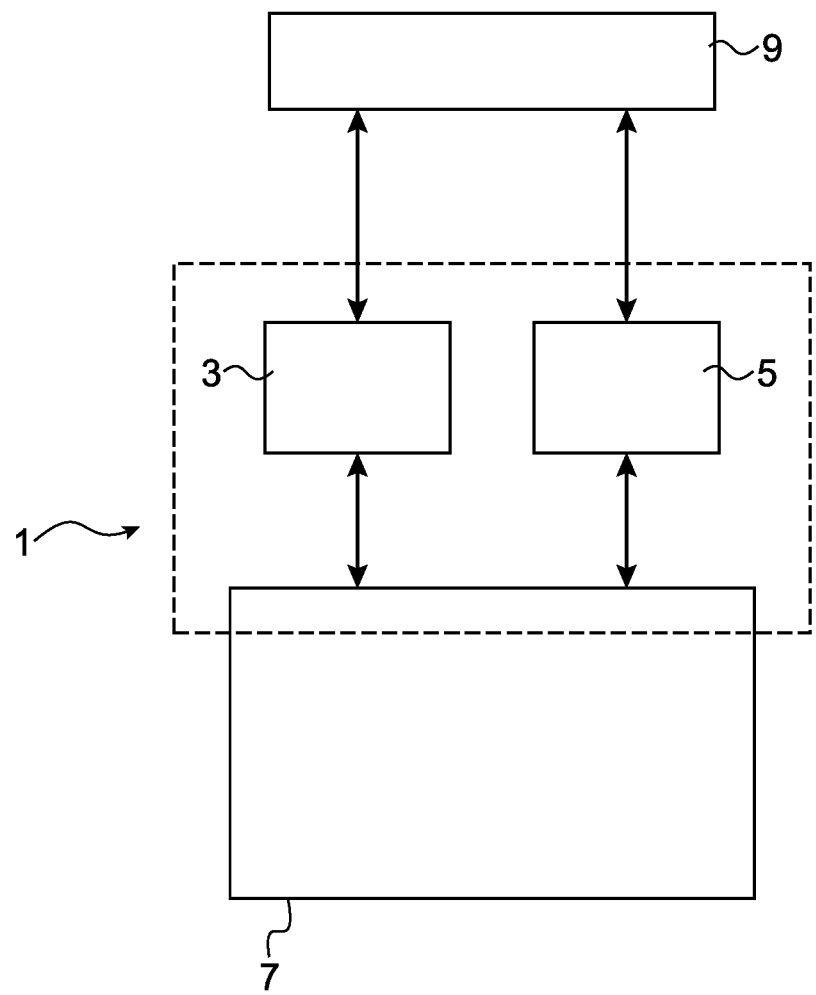
FIG. 1 very schematically illustrates a system for monitoring the pressure of a tight enclosure, according to the invention.

FIG. 1 very schematically illustrates a system for monitoring the pressure of a tight enclosure according to the invention.

In accordance with the invention, the monitoring system 1 includes a primary drive circuit 3 and a secondary safety circuit 5 independent of and dissimilar to the primary circuit 3.

The primary drive circuit 3 is configured to keep automatically the pressure of the tight enclosure 7 to an operational vacuum level. In other words, at each instant, the current pressure value of the tight enclosure 7 is kept by the primary drive circuit 3 within an operational pressure interval usually between −50 daPa and −30 daPa.

Further, in case where the current pressure value reaches, because of a failure, either of the primary bounds of a degradation interval (i.e. a value outside the operational interval), the primary drive circuit 3 is configured to insulate the tight enclosure 7 and to transmit a primary alert signal to a surveillance centre 9.

However, when the pressure of the tight enclosure 7 reaches, because for example of a failure of the primary circuit 3, a value outside the operational interval, the secondary safety circuit 5 goes into operation to secure the tight enclosure 7.

More particularly, when the pressure of the tight enclosure 7 reaches either of the secondary bounds of an alarm interval, the secondary safety circuit 5 is configured to insulate the tight enclosure 7 and to transmit a secondary alert signal to the surveillance centre 9.

Figure 2:
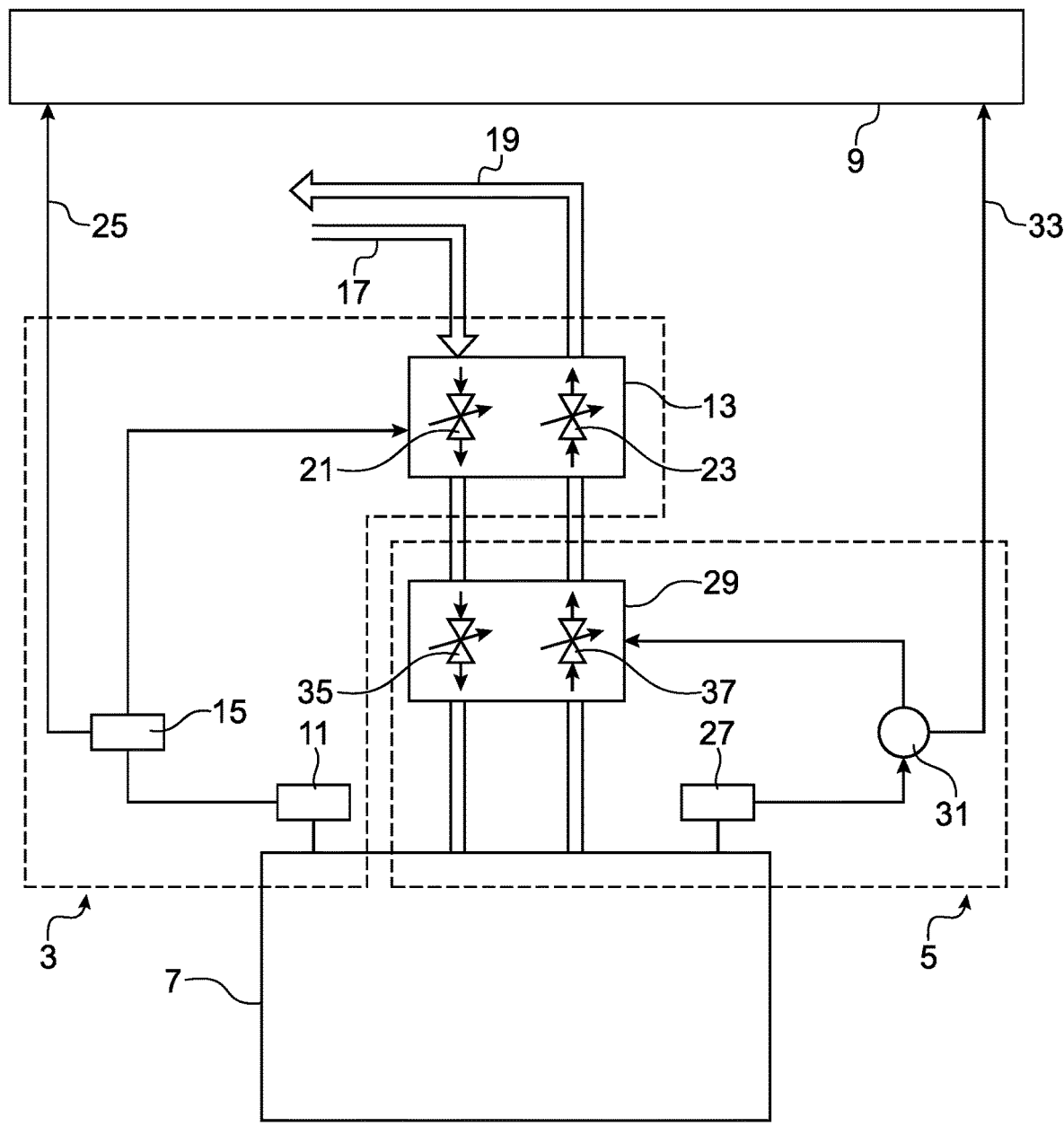
FIG. 2 very schematically illustrates a system for monitoring the pressure of a tight enclosure, according to one embodiment of the invention.

FIG. 2 very schematically illustrates a system for monitoring the pressure of a tight enclosure, according to one embodiment of the invention.

The monitoring system 1 includes a primary drive circuit 3 and a secondary safety circuit 5.

The primary drive circuit 3 includes a primary measuring module 11, a primary module of adjustment valves 13 and an automatic drive 15.

The primary measuring module 11 is configured to measure a first current pressure value of the tight enclosure 7 (i.e. measuring at each current instant the pressure inside the tight enclosure). Advantageously, acquiring pressure measurements is made by electronic means.

The primary module of adjustment valves 13 is connected to fluid 19 lines for blowing 17 and extracting a neutral gas or air. It is configured to regulate blowing and/or extracting neutral gas or air in a slight pressure (about 400 millibar) into or from the tight enclosure 7. Advantageously, the primary module of adjustment valves 13 includes blowing 21 and extracting 23 valves of the electropneumatic type that can be easily driven by the automatic drive 15.

The automatic drive 15 is wiredly or wirelessly connected to the primary measuring module 11 on the one hand and to the primary module of adjustment valves 13 on the other hand. It receives measurement signals from the primary measuring module 11 and transmits control signals to the primary adjustment module 13.

More particularly, the automatic drive 15 is configured to drive the primary adjustment module 13 as a function of the first current pressure value acquired by the primary measuring module 11 such that this pressure value remains within an operational vacuum interval corresponding to a regular operation of the tight enclosure. The operational interval is limited by lower and upper vacuum bounds of about −50 daPa and −30 daPa. Thus, thanks to the automatic drive, the pressure of the tight enclosure 7 is automatically kept at an operational vacuum level.

In case where the pressure of the tight enclosure 7 reaches (because of a failure) a vacuum value outside the operational interval, the automatic drive 15 thereby operates according to a degraded mode in which the tight enclosure 7 is insulated and the abnormality is signalled.

Indeed, in case where the first pressure value of the tight enclosure 7 reaches either of the primary bounds of a degradation interval for example between about −70 daPa and −20 daPa, the automatic drive 15 is configured to control via the primary module of adjustment valves 13 the insulation of the tight enclosure 7. In other words by order of the automatic drive 15, the primary adjustment module 13 closes to insulate the tight enclosure 7. Moreover, in the same degraded mode, the automatic drive 15 is configured to transmit a primary alert signal 25 to the surveillance (or remote surveillance) centre 9.

In case where the pressure of the tight enclosure 7 reaches either of the secondary bounds of an alarm interval (i.e. a value outside the degradation interval), the secondary safety circuit 5 which is independent of and dissimilar to the primary circuit 3 automatically goes into operation to secure the tight enclosure 7.

More particularly, the secondary safety circuit 5 includes a secondary measuring module 27, a secondary module of safety valves 29, and a safety module 31. The safety module 31 is wiredly connected to the secondary measuring module 27 on the one hand and to the secondary module of safety valves 29 on the other hand. It receives signals from the secondary measuring module 27 and transmits them to the secondary module of safety valves 29.

The secondary measuring module 27 is configured to measure at each current instant a second current pressure value of the tight enclosure 7 and to trigger a safety signal when this second pressure value reaches either of the secondary bounds of the alarm intervals. It will be noted that the pressure measurement made by the secondary measuring module 27 is completely independent of that made by the primary measuring module 11. Of course, at each same instant, the second current pressure value is substantially equal to the first current pressure value for primary 11 and secondary 27 measuring modules operating on a regular basis.

Besides, the secondary module of safety valves 29 is connected to the fluid blowing 17 and extracting 19 lines via the primary module of adjustment valves 13. More precisely, the secondary module of safety valves 29 is connected in series by fluid channels with the primary module of adjustment valves 13 and is disposed as close as possible to the tight enclosure 7. Advantageously, the secondary module of safety valves 29 includes blowing 35 and extracting 37 valves of the electropneumatic type that can be easily activated by the safety module 31.

In case where the pressure of the tight enclosure 7 reaches, (because for example of a failure in the primary drive circuit 3), a pressure value outside the degradation interval, the safety module 31 is configured to insulate automatically in real time the tight enclosure 7 and transmit an alert.

More particularly, in case where the second current pressure value of the tight enclosure 7 reaches either of the secondary bounds of the alarm interval between for example about −80 daPa and −10 daPa, the safety module 31 is configured to transmit to the secondary module of safety valves 29 the safety signal triggered by the secondary measuring module 27 thus activating the insulation of the tight enclosure 7. Simultaneously, the safety module 31 is configured to transmit in real time and independently of the automatic drive 15 the safety signal representative of a secondary alert signal 33 to the surveillance (or remote surveillance) centre 9.

Advantageously, the primary bounds of the degradation interval are contained in the alarm interval. In other words, the secondary bounds (−80 daPa and −10 daPa) are respectively defined outside the primary bounds (−70 daPa and −20 daPa) of the degradation interval. Thus, any interference problem between both primary 3 and secondary 5 circuits is avoided. Moreover, within the scope of periodical tests, the elements of both circuits 3 and 5 can be easily discriminated.

Advantageously, the primary drive circuit 3 is a programmed logic wired or wireless circuit whereas the secondary safety circuit 5 is a wired logic wire circuit. The wired logic circuit is robust and extremely reliable and simply and quickly operates under the action of binary signals (i.e. trigger or non-trigger signal) whereas the programmed circuit requires some programming of the automatic drive 15.

Figure 3:
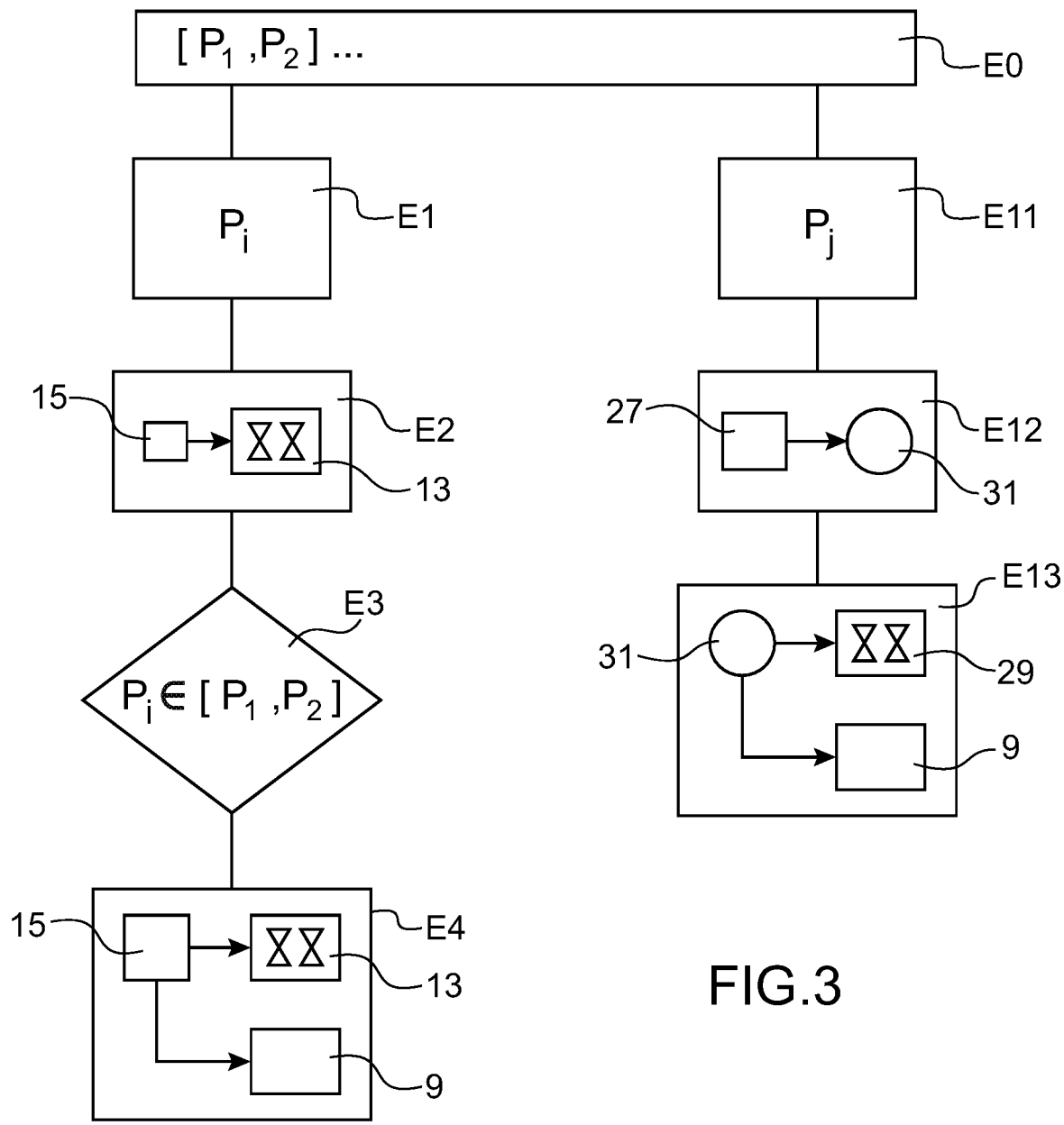
FIG. 3 is a flowchart very schematically illustrating a method for monitoring the pressure of a tight enclosure, according to one embodiment of the invention.

FIG. 3 is a flowchart very schematically illustrating a method for monitoring the pressure of a tight enclosure, according to one embodiment of the invention.

Step E0 is an initialising step defining for example, the operational interval, the degradation interval and the alarm interval.

Steps E1 to E4 are implemented by the primary circuit whereas steps E11 and E12 are implemented in parallel and independently by the secondary circuit.

Steps E1 to E3 form a loop and have the function to keep automatically the tight enclosure at an operational vacuum level.

More particularly, step E1 relates to measuring the current pressure $P_i$ of the tight enclosure 7 by the primary measuring module 11.

In step E2, the automatic drive 15 drives the primary module of adjustment valves 13 as a function of the current pressure value of the tight enclosure 7 such that the pressure value remains constantly included in the operational vacuum interval.

Step E3 is a test made by the automatic drive 15 to check whether the current pressure value $P_i$ of the tight enclosure 7 is included in the operational vacuum interval $[P_1, P_2]$. If yes, the process turns back to step E1. Otherwise (i.e. if the current pressure value reaches a value outside the operational interval), the process goes to step E4.

In step E4, the automatic drive 15 transmits to the primary module of adjustment valves 13 closing orders to insulate the tight enclosure 7. Further, the automatic drive 15 transmits a primary alert signal 25 to the surveillance centre 9.

Besides, step E11 relates to measuring the current pressure $P_j$ of the tight enclosure 7 by the secondary measuring module 27.

In step E12, as soon as the current pressure value reaches either of the secondary bounds of the alarm interval for example between about −80 daPa and −10 daPa, the secondary measuring module 27 triggers a safety signal intended to the safety module 31.

In step E13, the safety module 31 switches the safety signal both to the secondary module of valves 29 to insulate the tight enclosure 7 and to the surveillance centre 9.

Figure 4:
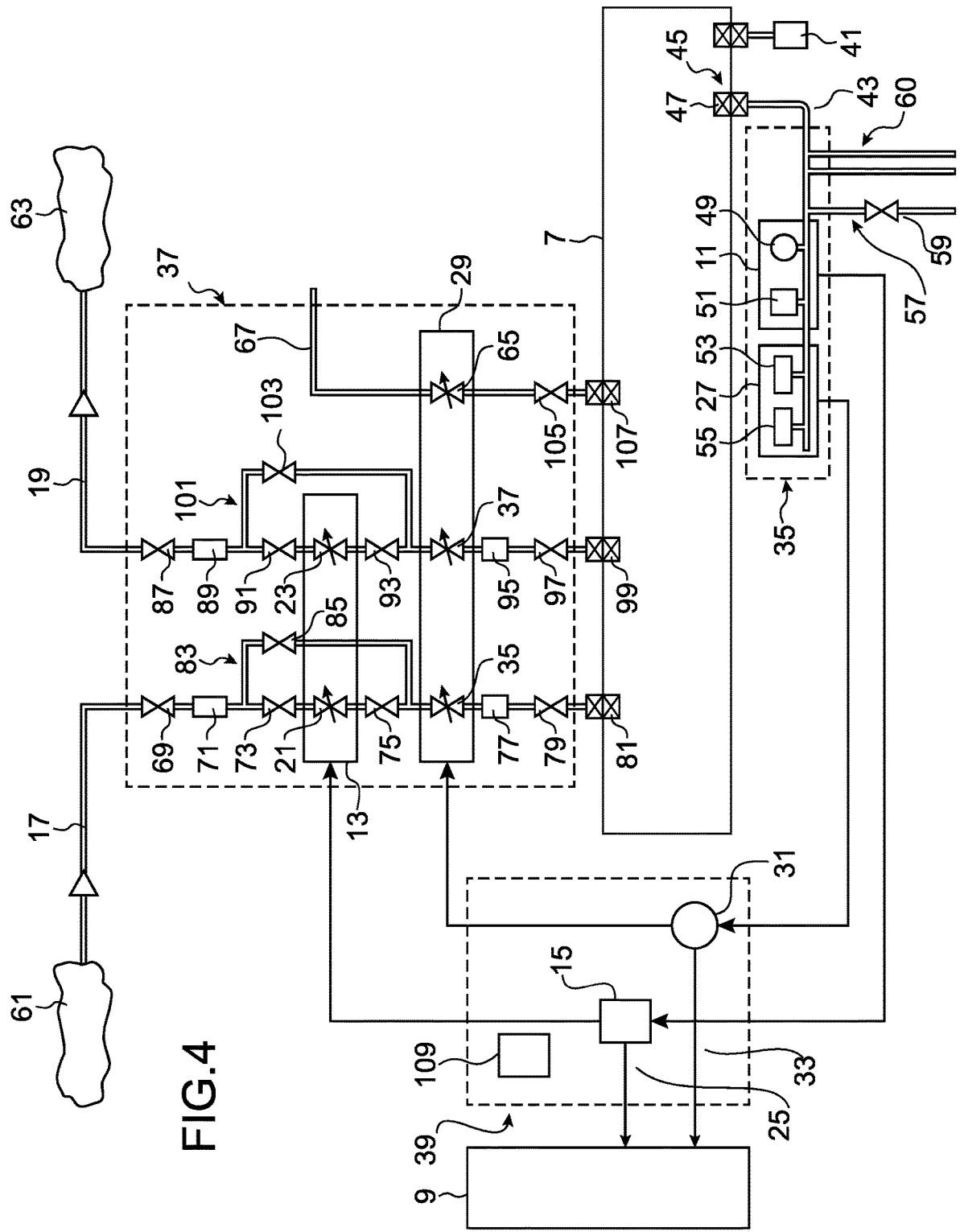
FIG. 4 very schematically illustrates a system for monitoring the pressure of a tight enclosure, according to a preferred embodiment of the invention.
Figure 5:
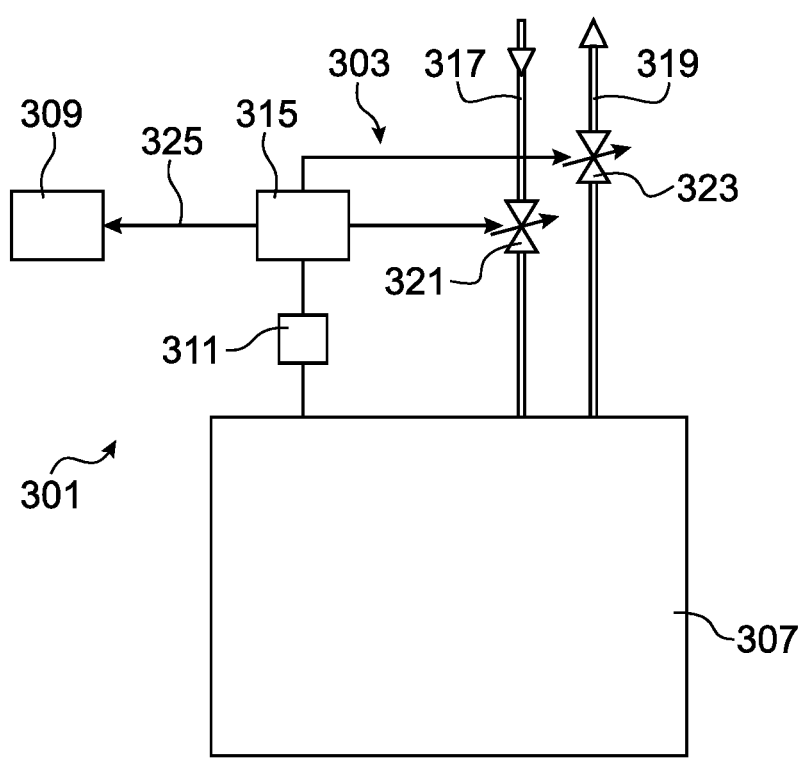
FIG. 5 schematically illustrates a system for regulating a tight enclosure, according to prior art.

FIG. 4 very schematically illustrates a system for monitoring a pressure of a tight enclosure, according to a preferred embodiment of the invention.

The monitoring system includes several members comprising a measuring manifold 35, a regulation and safety package 37, a control and safety casing 39, and a seal pot 41. Each of these members includes one or more elements and part of all these elements is gathered into first and second independent groups. The first group of elements includes a primary measuring module 11, a primary module of adjustment valves 13 and an automatic drive 15 which are coupled with each other wiredly or wirelessly to form a primary drive circuit 3. The second group of elements includes a secondary measuring module 27, a secondary module of safety valves 29, and a safety module 31 coupled with each other wiredly to form a secondary safety circuit 5 independent of and dissimilar to the primary circuit 3.

More particularly, the measuring manifold 35 includes the primary 11 and secondary 27 measuring modules disposed on a conduit connected via a flexible hose 43 to a reference intake 45 of the tight enclosure 7. Further, the reference intake 45 comprises a double filtration 47.

The primary measuring module 11 includes a pressure gauge 49 which indicates the vacuum as well as an electronic pressure sensor 51 (for example, a pressure differential sensor) which is configured to measure the pressure in the tight enclosure 7 and to transmit each current value to the automatic drive 15.

The secondary measuring module 27 includes first 53 and second 55 electromechanic type pressure switches. The pressure switches 53, 55 are configured to trigger safety signals in real time when the current pressure value of the tight enclosure 7 reaches predetermined lower and upper alarm thresholds. Resorting to two distinct pressure switches 53, 55 enables both alarm thresholds to be dissociated from each other and consequently, the reliability to be increased. Alternatively, the first 53 and second 55 pressure switches can be replaced by a single pressure switch which triggers a safety signal when the pressure value reaches either of the lower and upper alarm thresholds.

Advantageously, the measuring manifold 35 further includes a tightness test intake 57. This intake 57 comprises a tightness monitoring valve 59 on which a calibrated tightness measuring apparatus can be directly connected without requiring to disconnect the measuring manifold 35. Thus, the tightness of the enclosure 7 can be readily monitored for example periodically.

Further, the measuring manifold 35 advantageously includes a double shutoff connector 60 (of the STAUBLI type) comprising a pressure intake for a complementary flow rate valve, for easily and quickly uncoupling the conduit of the manifold during maintenance operations.

Besides, the regulation and safety package 37 is connected via a fluid blowing line 17 to a supply network 61 for supplying a low pressure neutral gas or air on the one hand and via a fluid extracting line 19 to an extracting network 63 for extracting gas or air on the other hand. It includes the primary module of regulation valves 13 and the secondary module of safety valves 29 which are configured to regulate blowing and extracting neutral gas or air into or from the tight enclosure 7.

More particularly, the primary module of regulation valves 13 includes a primary extracting valve 23 connected to the fluid extracting line 19 and a primary blowing valve 21 connected to the fluid blowing line 17. The secondary module of safety valves 29 includes a secondary extracting valve 37 connected in series with the primary extracting valve 23, and a secondary blowing valve 35 connected in series with the primary blowing valve 21. Advantageously, the secondary module of safety valves 29 further includes a specific gas or vacuum inlet valve 65 connected to a gas or vacuum inlet ancillary fluid line 67. The ancillary fluid line 67 is for implementing a possible specific method in a closed and specific space (for example, a bell) inside the tight enclosure 7. The gas or vacuum inlet specific valve 65 is configured to monitor the vacuum level in the specific closed space of the tight enclosure 7.

According to the example of FIG. 4, the fluid blowing line 17 connects in series several elements consecutively including from an upstream end relative to the blowing direction (i.e. in the fluid flow direction directed from the source of the supply network 61 to the tight enclosure 7): a first manual valve 69, a first flow meter 71 for measuring the gas flow rate through the conduit of the fluid blowing line 17, a second manual valve 73, the primary blowing valve 21 (for example, of the electropneumatic type), a third manual valve 75, the secondary blowing valve 35 (for example, of the electropneumatic type), a first metal expansion bellows 77 for dissociating the part relative to the fluid conduits from to that related to the tight enclosure 7, and finally, a fourth manual valve 79 connected to the tight enclosure 7 via a first double filtration 81 (i.e., a filter outside and another inside the tight enclosure 7).

Advantageously, a portion of the fluid blowing line 17 containing the primary blowing valve 21 is by-passed by a fluid by-pass branch 83 comprising a fifth manual valve 85 enabling in case of failure the primary blowing valve 21 to be short-circuited thus facilitating placing again the tight enclosure 7 under vacuum. According to this example, the by-pass branch 83 is connected between the upstream end of the second manual valve 73 and the downstream end of the third manual valve 75.

It will be noted that, according to the architecture of the fluid blowing line 17, a manual valve 69, 73, 75, 79 is advantageously disposed downstream and upstream of each of the specific elements comprised of the first flow meter 71, the primary blowing valve 21, the secondary blowing valve 35 and the first expansion bellows 77. The different manual valves 69, 73, 75, 79 enable the tight enclosure 7 to be manually insulated in case of an abnormality and/or to throttle the blowing network 61 in order to monitor the gas flow rate, and/or to replace readily failing elements.

The fluid extracting line 19 connects in series several elements consecutively including from a downstream end relative to the extracting direction (i.e. in a fluid flow direction coming from the tight enclosure 7): a sixth manual valve 87, a second flow meter 89, a seventh manual valve 91, the primary extracting valve 23 (for example, of the electropneumatic type), an eighth manual valve 93, the secondary extracting valve 37 (for example, of the electropneumatic type), a second metal expansion bellows 95, and finally a ninth manual valve 97 connected to the tight enclosure 7 via a second double filtration 99.

Likewise, a portion of the fluid extracting line 19 containing the primary extracting valve 23 is by-passed by a fluid by-pass branch 101 comprising a tenth manual valve 103 enabling in case of failure, the primary extracting valve 23 to be short-circuited. According to this example, the fluid by-pass branch 101 is connected between the upstream end of the seventh manual valve 91 and the downstream end of the eighth manual valve 93.

It will be also noted that, according to the architecture of the fluid extracting line 19, a manual valve 87, 91, 93, 97 is advantageously disposed downstream and upstream of each of the second flow meters 89, the primary extracting valve 23, the secondary extracting valve 37 and the second expansion bellows 95.

The gas or vacuum inlet ancillary fluid line 67 includes the gas or vacuum inlet specific valve 65 (for example, of the electropneumatic type) connected in series to an eleventh manual valve 105 connected to the tight enclosure 7 via a third double filtration 107.

Besides, the control and safety casing 39 includes the automatic drive 15, the safety module 31 and possibly, a control and display interface 109. The control and display interface 109 is configured to operate the tight enclosure 7. It is also configured to display light signals and/or to emit sound signals as soon as the current pressure value measured by the electronic sensor 51 reaches predetermined degradation thresholds or as soon as either of the pressure switches 53, 55 detects a pressure reaching a first or a second predetermined alarm threshold.

The automatic drive 15 is configured to receive the current pressure value from the electronic pressure sensor 51 and to drive the primary extracting valve 23 as well as the primary blowing valve 21 as a function of this current value. Advantageously, the current pressure value is displayed on the control and display interface 109.

When the current pressure value reaches the lower bound (usually, −50 daPa) of the operational interval, the automatic drive 15 controls the closure of the primary extracting valve 23 and the opening of the primary blowing valve 21.

On the other hand, when the current pressure value reaches the upper bound (usually, −30 daPa) of the operational interval, the automatic drive 15 controls the opening of the primary extracting valve 23 and closing of the primary blowing valve 21.

Thus, the automatic drive 15 automatically keeps the tight enclosure 7 at an operational vacuum level. It will be noted that if the manual valves of the primary drive circuit 3 are well adjusted, the vacuum remains stable and consequently, the primary extracting 23 and blowing 21 valves are found little loaded.

Besides, when the current pressure value of the tight enclosure 7 reaches the lower bound (usually, −70 daPa) or the upper bound (usually, −20 daPa) of the degradation interval, the automatic drive 15 controls the closure of the primary extracting 23 and blowing 21 valves in order to insulate the tight enclosure 7 and further transmits a primary alert signal 25 to the surveillance (or remote surveillance) centre 9. It will be noted that the surveillance centre 9 can be very far from the tight enclosure 7 and generally, it can be intended to monitor a plurality of tight enclosures and possibly a plurality of other pieces of equipment.

Advantageously, the light and/or sound alert signal is also locally displayed on the control interface 109.

Besides, in case of a dysfunction of the primary drive circuit 3 and in case where the current pressure value of the tight enclosure 7 reaches a pressure value outside the degradation interval, the secondary safety circuit 5 then goes into operation to secure the tight enclosure 7 in an insulation configuration.

Advantageously, the secondary circuit 5 is a wired logic circuit and the safety module is a safety relay 31 which enables the binary signals from the pressure switches 53, 55 to be relayed to the secondary module of valves 29 as well as to the surveillance centre 9.

Indeed, when the current pressure value of the tight enclosure 7 reaches the lower bound (for example, −80 daPa) of the alarm interval, the first pressure switch 53 triggers a safety signal which commands via the safety relay 31 to close the secondary extracting valve 37, the secondary blowing valve 35, and the gas or vacuum inlet specific valve 65. The safety signal is also relayed faithfully by the safety relay 31 to the surveillance centre 9. Advantageously, a safety light and/or sound signal is also locally displayed on the control interface 109.

On the other hand, when the current pressure value of the tight enclosure reaches the upper bound (for example, −10 daPa) of the alarm interval, the second pressure switch 55 triggers a safety signal which commands via the safety relay 31 to close the secondary extracting valve 37, the secondary blowing valve 35, and the gas or vacuum inlet specific valve 65. Likewise, the safety signal is also relayed to the surveillance centre 9. Advantageously, a safety light and/or sound signal is also locally displayed on the control interface 109.

As a last resort, in the very unlikely case where both primary 3 and secondary 5 circuits are failing, the seal pot 41 is triggered in order to protect the tight enclosure 7 when the pressure of the enclosure 7 exceeds the alarm thresholds. The seal pot 41 includes in a known manner, a safety hydraulic valve which accommodates incidental overpressures or over-vacuums in order to drop pressure of the tight enclosure 7.

The monitoring system of the present invention thus enables the tight enclosure to be put in a safe state reliably automatically and in real time. It also enables the transmission in real time of the pressure fault to a surveillance or remote surveillance centre to be made reliable. Further, it enables the tight enclosure to be readily put again in a vacuum state when an adjustment valve is failing. It also enables failing elements to be replaced by keeping the pressure gradient of the tight enclosure.

Of course, various modifications can be provided by those skilled in the art to the invention just described, only by way of non-limiting examples.

The invention claimed is:

1. A system for monitoring pressure of a glove box or containment enclosure tight enclosure, comprising:

a primary drive circuit configured to keep a current pressure value of the tight enclosure in an operational pressure interval, the primary drive circuit further configured to insulate the tight enclosure and to transmit a primary alert signal in a case that the current pressure value reaches either of primary bounds of a degradation interval;

a secondary safety circuit independent of and dissimilar to said primary circuit, said secondary safety circuit configured to insulate the tight enclosure and to transmit a secondary alert signal when the current pressure of the tight enclosure reaches either of secondary bounds of an alarm interval.

2. The system according to claim 1, wherein the primary drive circuit is a programmed logic circuit and the secondary safety circuit is a wired logic circuit.

3. The system according to claim 1, wherein the primary drive circuit includes:

a primary measuring module configured to measure a first current pressure value of the tight enclosure;

a primary module of adjustment valves; and an automatic drive configured to drive the primary adjustment module such that the first current pressure value remains within the operational pressure interval, the automatic drive being further configured to control insulation of the tight enclosure and to transmit the primary alert signal to a surveillance center in a case the first current pressure value reaches either of the primary bounds of the degradation interval; and the secondary safety circuit includes:

a secondary measuring module configured to measure a second current pressure value of the tight enclosure and to trigger a safety signal when the second pressure value reaches either of the secondary bounds of the alarm interval;

a secondary module of safety valves; and a safety module configured to transmit the safety signal to the secondary module of valves to insulate the tight enclosure and to the surveillance center, the safety signal corresponding to the secondary alert signal.

4. The system according to claim 3, wherein the secondary measuring module includes:

a first pressure switch configured to trigger the safety signal when the second current pressure value reaches a first secondary bound of the alarm interval; and a second pressure switch configured to trigger the safety signal when the second current pressure value reaches a second secondary bound of the alarm interval.

5. The system according to claim 3, wherein the safety module is a safety relay configured to relay the safety signal triggered by either of the first and second pressure switches to the secondary module of safety valves to insulate the tight enclosure and to the surveillance center.

6. The system according to claim 3, wherein the primary module of regulation valves includes a primary extracting valve for being connected to an extracting fluid line and a primary blowing valve for being connected to a blowing fluid line, and the secondary module of safety valves includes a secondary extracting valve for being connected in series with the primary extracting valve, and a secondary blowing valve for being connected in series with the primary blowing valve.

7. The system according to claim 6, wherein the secondary module of safety valves further includes a gas inlet or vacuum specific valve for being connected to a gas inlet or vacuum ancillary fluid line.

8. The system according to claim 6, wherein each of the primary extracting and blowing valves includes a by-pass fluid line enabling in a case of failure, either of the primary valves to be short-circuited.

9. The system according to claim 6, further comprising manual valves upstream and downstream of each of the primary and secondary extracting and blowing valves.

10. The system according to claim 3, further comprising a measuring manifold comprising the primary and secondary measuring modules and a tightness test pressure intake and a double shutoff connector.

11. The system according to claim 1, wherein the primary bounds of the degradation interval are contained in the alarm interval.

12. The system according to claim 1, wherein the primary bounds are about −20 daPa and −70 daPa, and secondary bounds are about −10 daPa and −80 daPa.

13. The system according to claim 1, further comprising an ultimate safety hydraulic valve.

14. A glove box or containment enclosure type tight enclosure comprising the monitoring system according to claim 1.

15. The tight enclosure according to claim 14, wherein the tight enclosure is a glove box or a containment enclosure.

16. The system according to claim 1, wherein pressure measurements made by the secondary safety circuit are completely independent of pressure measurements made by the primary drive circuit.

\* \* \* \* \*